United States Patent
Van Der Zaag et al.

(10) Patent No.: US 12,529,631 B2
(45) Date of Patent: Jan. 20, 2026

(54) DEVICE FOR STAINING 3D BIOPSY TISSUE

(71) Applicant: KONINKLIJKE PHILIPS N.V., Eindhoven (NL)

(72) Inventors: Pieter Jan Van Der Zaag, Waalre (NL); Roland Cornelis Martinus Vulders, Eindhoven (NL); Danielle Elisa Willemine Clout, Eindhoven (NL); Johannes Theodorus Wilhelmus Maria Van Eemeren, Helmond (NL); Anja Van De Stolpe, Vught (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1806 days.

(21) Appl. No.: 16/065,254

(22) PCT Filed: Dec. 23, 2016

(86) PCT No.: PCT/EP2016/082603
§ 371 (c)(1),
(2) Date: Jun. 22, 2018

(87) PCT Pub. No.: WO2017/109201
PCT Pub. Date: Jun. 29, 2017

(65) Prior Publication Data
US 2021/0270705 A1 Sep. 2, 2021

(30) Foreign Application Priority Data

Dec. 24, 2015 (EP) .................................... 15202666

(51) Int. Cl.
*G01N 1/31* (2006.01)
*A61B 10/00* (2006.01)
(Continued)

(52) U.S. Cl.
CPC ........... *G01N 1/31* (2013.01); *A61B 10/0096* (2013.01); *A61B 10/0275* (2013.01);
(Continued)

(58) Field of Classification Search
CPC .......... G01N 1/31; G01N 21/05; G01N 21/11; G01N 2021/052; G01N 1/30;
(Continued)

(56) References Cited

U.S. PATENT DOCUMENTS 6,322,522 B1  11/2001  Zimmon
6,432,064 B1 *  8/2002  Hibner ............... A61B 10/0275
                                                 600/564

(Continued)

FOREIGN PATENT DOCUMENTS

CN   101543414 A   9/2009
EP     2614778 A2   7/2013
(Continued)

OTHER PUBLICATIONS

PCT International Search Report, International application No. PCT/EP2016/082603, Apr. 13, 2017.
(Continued)

*Primary Examiner* — Henry H Nguyen

(57) ABSTRACT

A method and system for processing a 3D tissue sample is provided, comprising the steps of receiving a tube with an inner space and two open ends, wherein the tube is configured to retain the 3D tissue sample in the inner space, arranging the tube so that one of the two open ends of the tube is located at a fluid channel, and forcing or actively pressing a tissue processing agent through the fluid channel and into the tube so that the tissue processing agent passes through the tissue.

3 Claims, 7 Drawing Sheets

(51) Int. Cl.
*A61B 10/02* (2006.01)
*G01N 21/05* (2006.01)
*G01N 21/11* (2006.01)

(52) U.S. Cl.
CPC .......... *A61B 10/0283* (2013.01); *G01N 21/11* (2013.01); *G01N 2021/052* (2013.01)

(58) Field of Classification Search
CPC ............ A61B 10/0096; A61B 10/0275; A61B 10/0283; A61B 10/04
See application file for complete search history.

(56) References Cited

U.S. PATENT DOCUMENTS

| | | | |
|---|---|---|---|
| 8,003,388 B2 | 8/2011 | Neumann | |
| 10,092,279 B2 | 10/2018 | Pasternak | |
| 10,143,450 B2 | 12/2018 | Bierhoff | |
| 2002/0029006 A1 | 3/2002 | Turturro | |
| 2005/0016921 A1* | 1/2005 | Gjerde | G01N 35/10 436/178 |
| 2005/0255005 A1* | 11/2005 | Motadel | B01L 3/0275 422/400 |
| 2006/0228810 A1* | 10/2006 | Bleuel | B01J 3/008 436/174 |
| 2007/0038146 A1* | 2/2007 | Quick | A61B 10/0283 600/568 |
| 2008/0038839 A1* | 2/2008 | Linder | B01L 3/0293 422/68.1 |
| 2008/0068706 A1 | 3/2008 | Goodman | |
| 2008/0068707 A1 | 3/2008 | Goodman | |
| 2012/0071749 A1 | 3/2012 | Xu | |
| 2015/0144490 A1 | 5/2015 | Deisseroth | |
| 2015/0247791 A1* | 9/2015 | Koerperick | G01N 21/05 250/341.1 |
| 2017/0319186 A1 | 11/2017 | Van Der Zaag | |

FOREIGN PATENT DOCUMENTS

| | | | | |
|---|---|---|---|---|
| JP | 2001004506 A | 1/2001 | | |
| JP | 2011019741 A | 2/2011 | | |
| JP | 2011030913 A | 2/2011 | | |
| RU | 2212848 C2 | 9/2003 | | |
| WO | WO-2014084731 A1 | * | 6/2014 | ............ B01L 3/0275 |

OTHER PUBLICATIONS

Observations on the PCT International Search Report and the Written Opinion of International Application No. PCT/EP2016/082603, Apr. 9, 2018.
Das, R. et al., "Beyond Isolated Cells: Microfluidic Transport of Large Tissue for Pancreatic Cancer Diagnosis", Proc SPIE Int Soc Opt Eng. Mar. 5, 2015; 9320: http://www.ncbi.nlm.nih.gov/pmc/articles/PMC4405631/.
Richardson, D.S. et al., "Clarifying Tissue Clearing", Cell. Jul. 16, 2015; 162(2): 246-257, Leading Edge Review.
"Credit Card-Sized Device Could Analyze Biopsy, Help Diagnose Pancreatic Cancer in Minutes", KurzweilAI | Accelerating Intelligence. News, Mar. 6, 2014 http://www.kurzweilai.net/credit-card-sized-device-could-analyze-biopsy-help-diagnose-pancreatic-cancer-in-minutes.
Nachabe, R. et al., "Estimation of Lipid and Water Concentrations in Scattering Media with Diffuse Optical Spectroscopy from 900 to 1600nm", Journal of Biomedical Optics, vol. 15, (3), 037015-1 to 037015-10, May/Jun. 2010.
Das, R. et al., "Pathology in a Tube: Step 1. Fixing, Staining, and Transporting Pancreatic Core Biopsies in a Microfluidic Device for 3D Imaging", Proc. SPIE 8976, Microfluidics, BioMEMS, and Medical Microsystems XII, 89760R (Mar. 6, 2014); http://spie.org/Publications/Proceedings/Paper/10.1117/12.2041106.
Verhaegh, W. et al., "Selection of Personalized Patient Therapy Through the Use of Knowledge-Based Computational Models that Identify Tumor-Driving Signal Transduction Pathways", Cancer Research, Integrated Systems and Technologies: Mathematical Oncology, 74 (11), Jun. 1, 2014, in press Apr. 2, 2014.
Chung, K.-H. et al., "Structural and Molecular Interrogation of Intact Biological System", Nature, 332, vol. 497, May 16, 2013.
Yokomizo, T. et al., "Whole-Mount Three-Dimensional Imaging of Internally Localized Immunostained Cells within Mouse Embryos", Nature Protocols, vol. 7, No. 3, 2012, p. 421-431.
"Helder Brein (Bright Brain)", newspaper article in Volkskrant (zaterdag Nov. 1, 2014), pp. 44 (1)-44 (3).

* cited by examiner

A

B

DEVICE FOR STAINING 3D BIOPSY TISSUE

CROSS-REFERENCE TO RELATED APPLICATIONS

This Application claims the priority benefit under 35 U.S.C. § 371 of International Patent Application No. PCT/EP2016/082603, filed Dec. 23, 2016, which claims the benefit of European Patent Application No. EP15202666.2, filed Dec. 24, 2015. These applications are hereby incorporated by reference herein in their entirety.

FIELD OF THE INVENTION

The invention generally relates to a system for staining tissue in its 3D shape as obtained by a biopsy. Particularly, the invention relates to a device for staining biopsy sample accommodated in a biopsy tube maintaining the integrity of an extracted tissue volume.

BACKGROUND OF THE INVENTION

For the proper analysis of tumours and defining the appropriate treatment detailed information on a tumour may be needed. First the presence and position of a potential tumour may be identified through medical imaging.

Subsequently a biopsy may be taken to assess whether or not the lesion is benign or malignant through pathology. An exemplary workflow for obtaining a biopsy is depicted in the upper part of FIG. 1. For positioning the biopsy device (usually a needle with a shaft 100 having a lateral recess 200, and an outer tubular member 500) accurately in the suspicious tissue, the correct location is commonly determined using image guidance such as Ultrasound or X-ray. While imaging may provide coarse guidance of the needle towards the region of interest, it is often challenging to identify precisely the boundaries of small lesions or tumors with the biopsy needle using standard imaging modalities. As a consequence, biopsies are often taken at the wrong location, which increases the risk of false diagnoses. Following an extraction of biopsy tissue out of a body, the tissue is subjected to for example a staining fluid 400 in an open receptacle 300.

Finally molecular diagnostic (MDx) analysis of the tissue may be done to determine which molecular mutations and molecular pathway drive the tumor in order to arrive at a proper treatment. In order to provide the correct molecular analysis, also tumor heterogeneity may be assessed to determine whether a single cancerous clone is responsible for the tumorous growth or whether multiple clones are present, so that possibly multiple biological pathways drive tumor growth and a combination of drugs may be given.

In the case of neo-adjuvant treatment, especially in case of a large tumor and in case of treatment with targeted drugs which target signal transduction pathways, the first diagnostic biopsy can be handled in a standard manner, however additional biopsies are needed to assess the heterogeneity of the tumor with respect to the underlying biology.

With these biopsies it is often not possible to obtain large tissue samples with sufficient material to perform all necessary analyses. One reason is that smaller needle are used for patient comfort and safety. Moreover, in the current pathology practice a significant fraction of the tissue is lost due to the histopathology sample preparation procedure, such as fixation, embedding and creating thin slices (so-called 2D tissue samples or pathology slides when such samples are mounted on a microscope slide), which typically have a thickness of less than 20 µm, typically about 4 µm.

Furthermore, it is a problem that typically staining of a 3D tissue sample, i.e. of a not-sliced sample, takes comparatively long as staining occurs through diffusion, for example in a set up as shown at the bottom of FIG. 1, with the tissue sample 200 taken out of the biopsy needle shaft 100 and located in an open container 300 filled with staining fluid 400. The tissue sample may be located in a bath of a staining fluid, with the staining fluid completely surrounding the tissue sample so that coloring staining material will slowly diffuse into the tissue from all sides. After 1 hour of diffusion, a tissue sample may look like the example in the left side of FIG. 2. No staining effect can be detected. After 24 hours of diffusion, a tissue sample may look like the example in the right side of FIG. 2. An outer region 240 becomes dark (i.e. being stained) and an inner region 220 remains without coloring (i.e. being not stained yet). In other words, the 3D tissue sample is still not entirely stained (through and through or said differently in depth) after 24 hours in the bath. EP 2 614 778 A2 describes a tissue harvesting apparatus which can prevent a worker from being stabbed with a needle tip of a needle tube at the time of disposal. Tissue may be sucked into the tube for harvesting the tissue from a body, and the tissue may be rinsed out of the tube for further processing by pumping a liquid to the tube.

SUMMARY OF THE INVENTION

In view of the above mentioned problems, it can be seen as a general object of the invention to get a so-called intact 3D tissue sample and to process it so as to allow an appropriate analysis.

This and further objects are solved by the subject-matter of the respective independent claims. Further embodiments are described in the dependent claims.

One solution to the above mentioned problems could be to minimize tissue sample loss by eliminating the post biopsy embedding and tissue slicing process. This implies analysis of the whole intact tissue biopsy. Such intact tissue sample analysis has the advantage, that the intact cancer tissue structure in such a sample is expected to provide important additional information on the tissue architecture of the cancer. Such information may be clinically actionable, for example in choosing the right therapy or in co-determining prognosis.

Such an intact tissue biopsy sample may require 3D staining and visualization of the staining results. Recent developments in pathology (so-called clearing protocols) make it possible to make such tissue samples in principle transparent, enabling 3D imaging through the whole sample (see "Whole-mount three-dimensional imaging of internally localized immunostained cells within mouse embryos" of Tomomasa Yokomizo et al. Nature Protocols Vol. 7, No. 3 2012, page 421-431, or see "Structural and molecular interrogation of intact biological systems" of Kwanghun Chung et al. Nature Vol. 497, 16 May 2013, page 332-339, or see also "Clarifying Tissue Clearing" of Douglas S. Richardson and Jeff W. Lichtman. Cell 162, Leading Edge Review, page 246-257, July 2015). Appropriate staining processes may be for example Hematoxylin and eosin staining, nuclear staining such at DAPI, antibodies used for staining, and staining to clear the tissue.

It is noted that this is in particular useful if staining is performed throughout the whole sample, meaning that antibodies penetrate for 500 micron or more into the tissue.

It may thus be seen as an object to provide a method and system allowing a tissue processing of a 3D tissue sample independent from the structure of the tissue, keeping in mind that a lot of extracellular matrix will for example interfere with easy diffusion into the sample, and that excess antibody, including not specifically bound antibody may be washed out.

In general, a method in accordance with the invention makes it possible to process, in particular to stain tissue samples as a whole. This also enables taking thin tissue biopsies (for example an intact thin cylindrical 3D sample), because no tissue is lost during the sample prep process. In addition 3D tissue analysis is expected to provide additional clinically relevant tumor information. When such thin biopsies can be taken, this enables taking multiple biopsies from one tumor to create a heterogeneity map of the tumor.

A solution to the mentioned problem can be seen in using a tube which is put into a staining station so that the staining no longer is performed by diffusion but actively under pressure which results in much faster penetration of the antibodies into the tissue and thus faster staining, as well as faster washing procedures.

The biopsy sample stays intact and 3D tissue architecture structures in the biopsy can be observed, and the best position from which the further molecular Dx analysis may be done can be decided.

Linking the location of these additional biopsies to the location on the imaging modalities is important for the correlation of any pathology and MDx results to the tumor location on medical imaging data/pictures. Linking all this information is a key part of an overall oncology strategy.

The process of the invention goes much faster (up to a 100× time improvement for a nuclear DAPI staining).

Moreover, a tumor heterogeneity map can be made for determining the appropriate drug cocktail as well as following the tumor response via imaging.

In general, a method of processing a 3D tissue sample, according to an embodiment, comprises the steps of receiving a tube with an inner space and two openings, wherein the tube is configured to retain the 3D tissue sample in the inner space, arranging the tube so that one of the two open ends of the tube is located at a fluid channel, and forcing a tissue processing agent through the fluid channel and into the tube so that the tissue processing agent passes through the tissue. FIG. 3A shows examples of tissue samples being stained in accordance with the invention. Here, the tissue 260 is almost completely stained after 15 minutes.

FIGS. 3B and 3C are provided herewith to provide a direct comparison of the staining method of the invention, with respect to the prior art methods based on a stain diffusion mechanism. In both cases, a kidney tissue sample is obtained by a punch biopsy, in 5 millimeters in diameter and divided in two thick pieces of approximately 2-3 mm each. The two pieces are washed with PBS (Phosphate Buffered Saline) for 10 minutes, fixated with 4% paraformaldehyde, and washed with PBS. The two pieces are stained with SIR-DNA dye (1:1500). The first piece of tissue is soaked in the staining liquid contained in e.g. a glass vial. As is well-known, the piece of tissue undergoes a slow process of diffusion of the stain into its thickness. The process is carried out during 16 hours. The second piece of tissue is placed and blocked in position in a tube. The same volume of stain liquid as used for the soaking process of the first piece of tissue is provided under a predefined pressure, here approximately 1.1 bar, to the inside of the tube via a first opening. The stain flows throuqh the tube and reaches the tissue with pressure. As the tissue does not move and blocks the flow (or a large part of it), the staining liquid is actively forced onto the tissue material. The pressure of the stain on the tissue is sufficiently high to force the stain to penetrate into, and even propagate through the thickness of the tissue. The process is carried out during 16 hours. The two pieces of tissue thus stained are then further processed in a conventional manner to obtain two respective blocks of tissue. A first slice is cut from the first block (prior art method) and passes through the center of its volume. Thus, the slice contains tissue that extends from the periphery to the deep inside of the volume of the block. A second slice is prepared in the same way from the second block (method of the invention). Both slices make approximately 4 micrometers so as to be able to observe what has occurred in the depth of the two pieces of tissue by conventional microscopy.

FIG. 3B shows an image of the first slice. A plot of the stain intensity versus the position from left to right in the slice is analyzed within the white rectangle and shown on the right hand side of this figure. As can be seen, the average level of the intensity ranges between 20 and 25. The two peaks at the two extremities of the plot show that the stain intensity is higher near the outer surface. In other words the stain intensity increases in the periphery area because this is where the diffusion mechanism starts from. This also illustrates that still the diffusion process has not been carried out sufficiently long to achieve a homogeneous level of staining through the entire thickness of the first piece of tissue.

FIG. 3C shows an image of the second slice and a respective plot of intensity within the same area represented by the white rectangle. First, just by visual inspection, it can be observed that this image shows much more contrast, sharpness and details of the tissue architecture than in FIG. 3B. Further, the plot shows that the average level of the stain intensity is above 65 or 70, which is almost three times what was obtained with the prior art method. For information the drop of the curve between 400 and 600 corresponds to the presence of a crack in the tissue at this region. This crack comes from the final preparation process from the stained piece of tissue to the block. It can be seen in the middle area of the image. Finally, the maximum variations of the intensity in this plot are much less important than in the plot of FIG. 3B. Therefore the staining is more homogeneous with the method of the invention. In conclusion, the staining method of the invention is much more powerful. In a same amount of time, the tissue is homogeneously stained in depth to a high intensity contrast, while with the conventional approach the process clearly needs to be continued for hours longer or even a few days to try to achieve the same results. It is noted that the term 'forcing' implies that the fluid not just flows to the tissue, for example due to gravity, but is actively pressed through a fluid channel in direction to and onto the tissue. The pressure under which the tissue processing fluid is supplied should be higher than atmospheric pressure. According to an embodiment, the tissue processing agent is forced through the fluid channel and into the tube with a pressure between 2 bar and 6 bar, preferably between 4 bar and 5 bar. For a block of kidney tissue, the preferred range may be between 1.1 bar and 3 bar, and more preferably between 1.1 bar and 2 bar.

In any case, the person skilled in the art will easily understand that a right pressure will depend on the tissue to be processed. Thus a choice for the right pressure delivered by the pump may have to take into account the fluidic resistance of the tissue, notably. In this effect, the person skilled in the art may for instance use mathematical models to determine a right pressure or perform trial experiments with the type of tissue in question. Furthermore, the determination of the right pressure may also consider the mechanical resistance of the tissue. Indeed, the pressure of the staining liquid on the tissue sample should be so high that it would cause any tissue deformation or damage.

Furthermore, it is emphasized that the tissue processing fluid is forced into one of the open ends of the tube to allow any air or liquids to escape the tube at the other end. This enables for example an even staining of the tissue. It will be understood that the tissue is preferably arranged within the tube such that no continuous fluid path beside the tissue is formed, i.e. such that no leakage occurs. For example, the tissue may fully occupy an entire cross-section of the tube, or at least most of the cross section of the tube.

As used herein, the term 'tube' encompasses any container with at least two openings and an inner space. In particular, the used term does not prescribe any shape of the cross section or any dimensions. For example, the openings may be located at the ends opposite to each other. A direction from one open end to another open end may be denoted as longitudinal direction. According to another example may at least one opening be located in a side surface of the tube.

According to an embodiment may the tissue processing agent be forced through the fluid channel and into the tube over a predetermined time, preferably over at least 10 minutes. This takes into account that the penetration of the tissue processing fluid into the tissue cannot be expected as occurring immediately.

The tissue processing agent may be a clearing agent such as benzyl alcohol/benzyl benzoate (BABB), which is a 1:1 or 1:2 mixture of benzyl ethanol and benzyl benzoate, and/or a staining agent, depending on the intended tissue processing and thus on the intended kind of analysis of the processed tissue sample. Other possible clearing agent may be found in the review by Richardson cited above. Consequently, the method according to an embodiment may further comprise the step of analyzing the tissue retained in the tube, after the tissue processing agent has passed through the tissue. The method may alternatively and/or additionally comprise the step of 3D imaging the tissue retained in the tube.

In an embodiment which may avoid using too much expensive reagent, the staining liquid may be recirculated through the tissue using a peristalic pump.

According to another aspect, a system for processing a 3D tissue sample comprises a tube with two open ends and an inner space, a tube retainer, and a pumping device for supplying a tissue processing fluid under pressure into the tube. Between the tube and the pumping device, a fluid channel may be provided. Furthermore, seals may be provided between the fluid channel and the tube as well as between the fluid channel and the pumping device.

It will be understood that the inner space of the tube shall receive and retain a 3D tissue sample for processing the same. For example, the tube may be used to extract a tissue sample out of a patient's body so that the tissue is already in the tube when the tube is placed in the tube retainer for processing the tissue inside the tube. However, the tissue may also be inserted into the tube outside the patient's body. Preferably, the tissue is placed in the tube such that no or at least limited leakage of tissue processing agent may occur (because no continuous fluidic path beside the tissue exist from one end of the sample to the other).

When the tube is retained by the tube retainer, one of the first and second open ends of the tube may be arranged, for example at the fluid channel, so that the tissue processing fluid is suppliable/can be supplied into the tube, through the fluid channel or not.

According to an embodiment the pressure under which the tissue processing fluid is supplied to the tube is higher than atmospheric pressure. The pressure may for example be supplied with a pressure between 2 bar and 6 bar, preferably between 4 bar and 5 bar. For a block of kidney tissue, the preferred range may be between 1.1 bar and 3 bar, and more preferably between 1.1 bar and 2 bar.

According to another embodiment the pumping device for supplying the tissue processing fluid is configured for supplying the tissue processing fluid with a constant pressure over a predetermined time, preferably over at least 10 minutes. In an automated process, in which a plurality of tubes with tissue samples can be processed, the duration of the supplying of the tissue processing fluid may be predetermined. Alternatively, the progress of the processing of the tissue, for example the staining, may be monitored so as to detect as to whether the intended result is achieved.

In an embodiment in which the tube is made of a transparent material, it is possible to optically analyze the tissue sample directly in the tube, i.e. without taking the tissue sample out of the tube. Thus, it is possible to insert the tissue into a transparent biopsy tube so that the tube can be moved to a tissue processing station like a staining station in which the necessary fixation, permeabilisation and staining reactions can be done, in a standardized manner. Such a tube allows for a simpler sample handling. The sample can be picked up in one piece and transferred, for example, to a staining unit. The biopsy stays in one piece, which is advantageous for the correlation of any pathology and MDx results to the medical imaging data/pictures. This approach enables standardization of the important fixation process of the biopsy and allows for a comparison and correlation of metabolomic markers for tumour activity, molecular diagnostic markers such as obtained from staining and molecular test such as PCR and/or sequencing, from the tumour biopsy and medical imaging data (obtained by modalities such MRI, ultrasound).

The tube may be made of a transparent material like, for example, glass or a hard plastic material. According to an embodiment, the biopsy tube may be coated with a silicone-coating which may reduce the friction within the biopsy tube. Furthermore, the biopsy tube may be made from a material having mechanical properties comparable with paraffin, so that the extracted biopsy tissue may stay within the biopsy tube during staining and possibly for cutting slices from the biopsy so as to investigate the tissue by a microscope.

According to an embodiment, the biopsy tube may have a length between 5 mm and 20 mm and may have an outer diameter up to 2 mm, with an inner diameter up to 1.6 mm. Preferably, the tube may have an outer diameter up to 1 mm. According to an embodiment, the outer diameter of the tube may be 0.5 mm. Assuming that the tissue fills a majority of the inner space within the tube, the tissue sample may have the shape of a post with a length between 5 mm and 20 mm and a diameter between 0.25 mm and 1.6 mm, with the cross section of the post being circular, oval or angular.

The tube (for taking a biopsy) may comprise a sharp edge at an end of the biopsy tube, which end will thus be configured to cut tissue when being pushed forward (distally) by means of a biopsy device.

Generally, a biopsy device for use with a tube may comprise an outer sleeve, a hollow main shaft and a tube shaft. The hollow main shaft may have a distal end portion with a side-wardly facing notch, and the main shaft may be adapted to be accommodated within the outer sleeve. The outer sleeve may be movable relative to the main shaft between a first position in which the notch is not covered by the outer sleeve, and a second position in which the notch is covered by the outer sleeve. The outer sleeve may have a sharp distal edge, wherein the sharp distal edge may be provided to cut tissue which is present in the notch so that the tissue can be isolated from surrounding tissue.

One end of the biopsy tube may be releasably attachable to a distal end of the tube shaft so that the tube is movable together with the tube shaft within the hollow main shaft between a proximal position in which the tube is not located in the notch, and a distal position in which the tube is located in the notch.

According to an embodiment the biopsy device may comprise optical fibers being embedded or otherwise integrated in the shaft of the device. Using a biopsy device with optical fibers, for biopsy taking, may have the following advantages:

- By measuring the optical spectrum of the surrounding tissue, one may determine whether the tumour/lesion has been reached, so that one may have a better chance of successfully taking a biopsy from the tumour.
- The metabolomic activity, through the NADH/FAD ratio, can be determined from the optical spectrum.
- By tissue sensing at the tip, it can be ensured that the device is correctly positioned at the location of interest. A biopsy may be obtained from exactly the same location as the tissue sensing by advancing only the main shaft until the notch is at the location of interest. A further tissue sensing of the tissue in the notch may be performed to control as to whether the correct tissue sample is captured in the notch of a biopsy device.

The system may further comprise a device adapted for ex-vivo tissue inspection, and/or a storage container for receiving extracted tissue in the biopsy tube and for storing pathology information obtained by an in-vivo tissue inspection and/or an ex-vivo tissue inspection.

The aspects defined above and further aspects, features and advantages of the present invention may also be derived from the examples of embodiments to be described hereinafter and are explained with reference to examples of embodiments. The invention will be described in more detail hereinafter with reference to examples of embodiments but to which the invention is not limited.

BRIEF DESCRIPTION OF THE DRAWINGS

The illustration in the drawings is schematically only and not to scale. It is noted that similar elements are provided with the same reference signs in different figures, if appropriate.

DETAILED DESCRIPTION OF EMBODIMENTS

Figure 1:
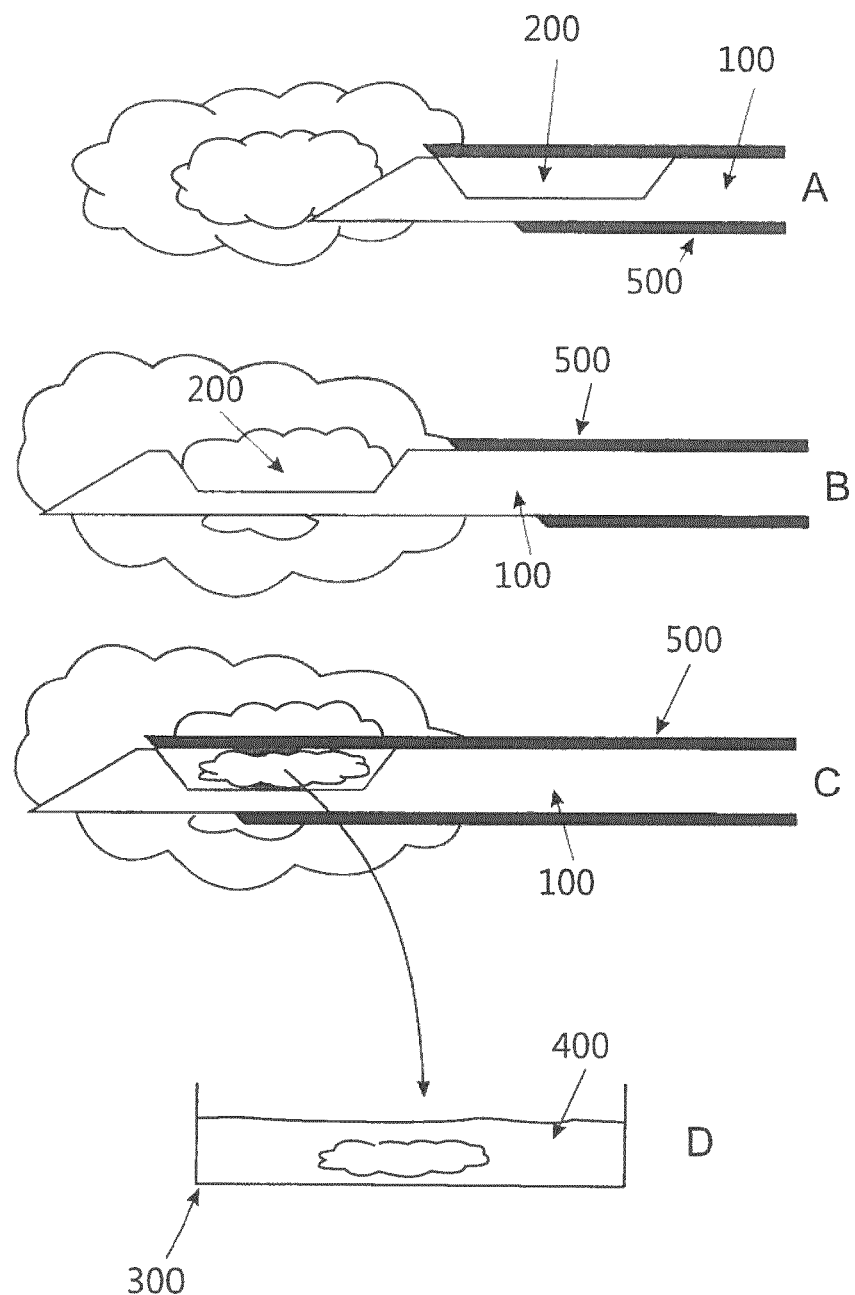
FIG. 1 illustrates steps of taking a biopsy and staining the biopsy tissue in accordance with the prior art.
Figure 2:
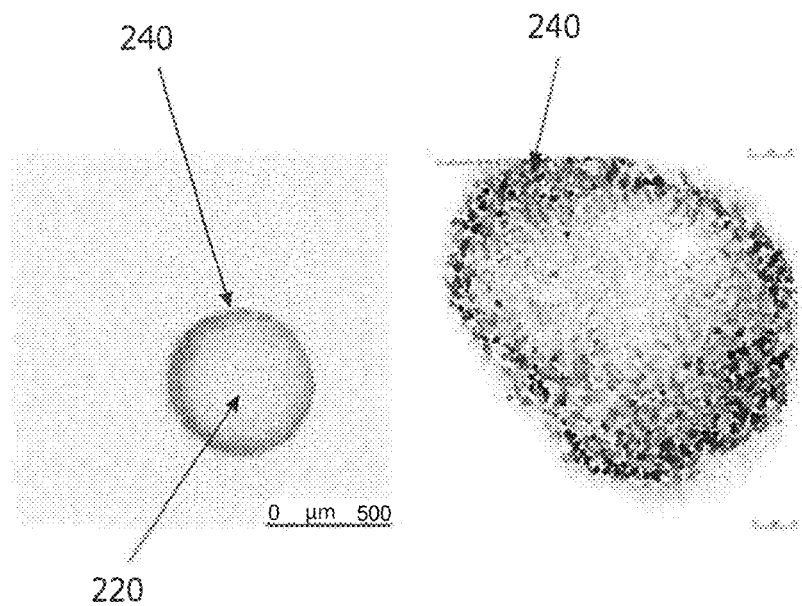
FIG. 2 illustrates examples of tissue samples stained by diffusion in accordance with the prior art.
Figure 3A:
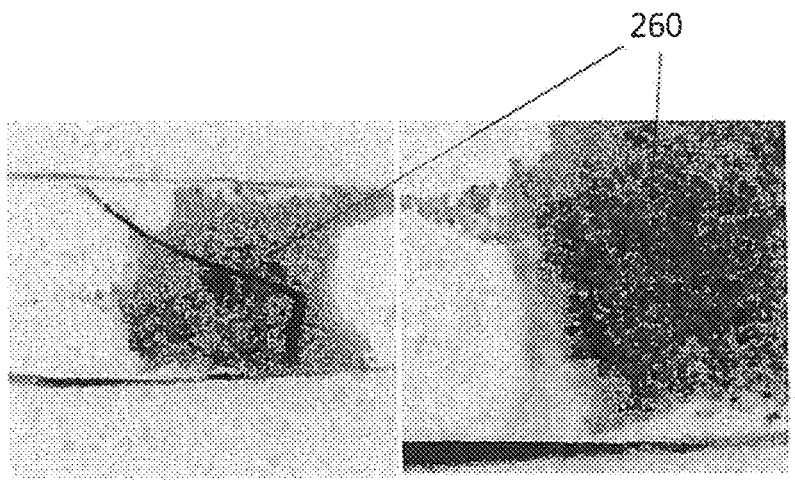
FIG. 3A illustrates examples of tissue samples stained in accordance with the invention.
Figure 3B:
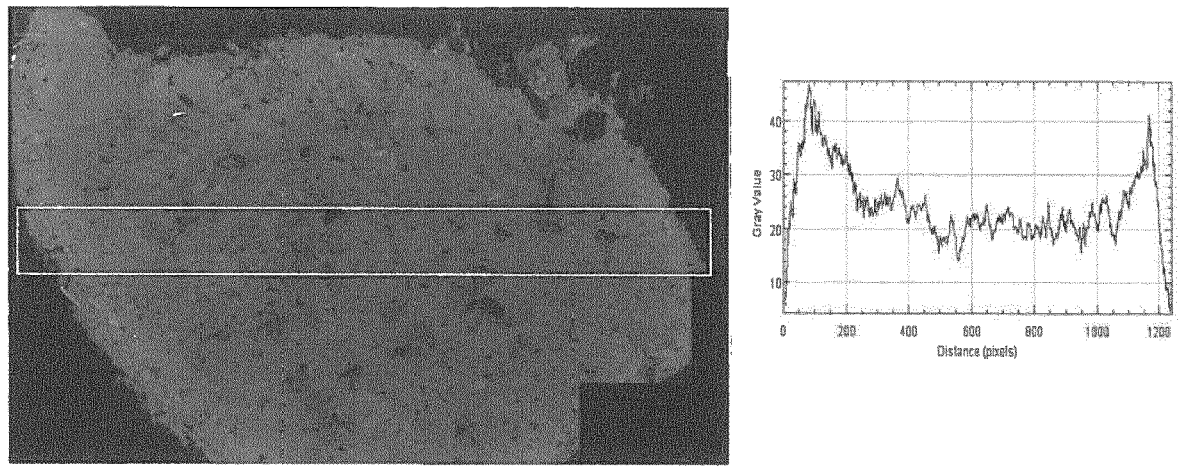
FIG. 3B shows another experimental result of a kidney sample stained by a diffusion mechanism, namely in accordance with the prior art.
Figure 3C:
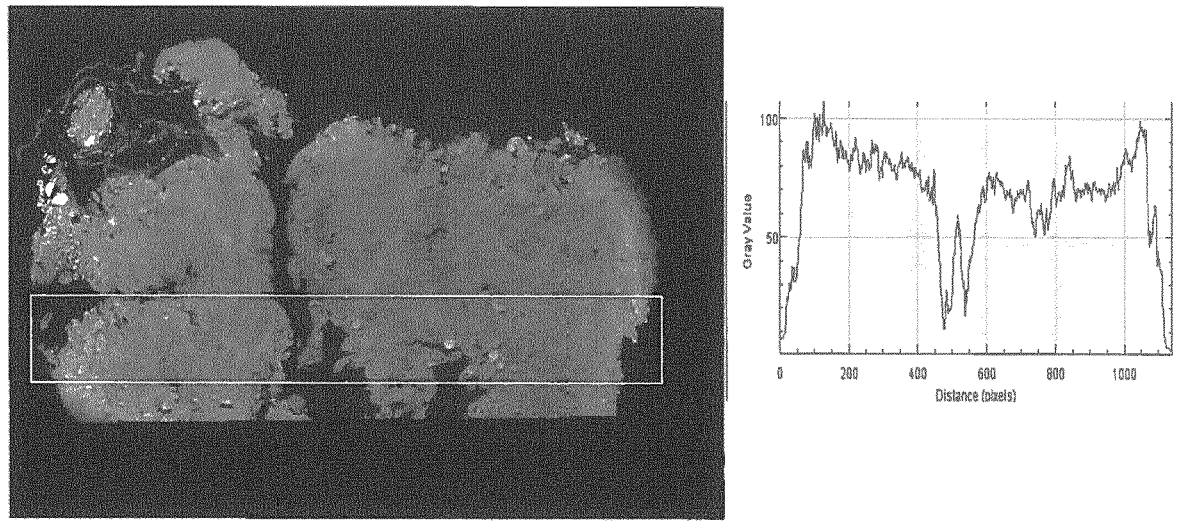
FIG. 3C shows an experimental result of the same kidney sample as in FIG. 3B, but stained in accordance with the invention.
Figure 4:
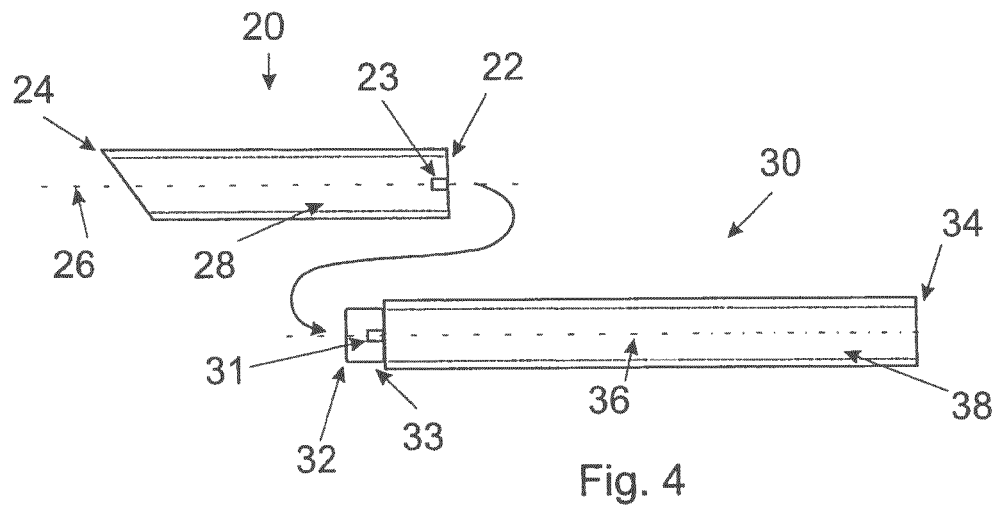
FIG. 4 shows a biopsy tube and a tube shaft.

In FIG. 4, embodiments of a biopsy tube 20 and a tube shaft 30 are shown. The biopsy tube 20 is substantially formed as a hollow cylinder with first and second ends each having a straight edge. In this embodiment, the first end 22 is formed with an angle of 90° relative to the longitudinal axis 26, i.e. substantially perpendicular to the longitudinal axis. The second end 24 is formed with an inclined angle relative to the longitudinal axis 26, wherein this angle may be in the range between 45° and 65°, for example 55°. It will be understood that the angles at the ends of the biopsy tube may be adapted to fit to inclined surfaces of a notch formed in a main shaft of a biopsy device, as described in detail below. For example, the length of such a biopsy tube may be 14 mm+/−5 mm and an outer diameter may be 2 mm, whereas an inner diameter of a channel 28 which extends through the cylinder, may be between 1.4 and 1.6 mm. The biopsy tube may be made of glass or from a hard and transparent plastic such as Polymethyl methacrylate (PMMA). Furthermore, the biopsy tube 20 may be provided with a sharp edge at one end, in particular at the leading end, i.e. the distal end when the biopsy tube is pushed forwards by the tube shaft 30. The tube shaft 30, as shown in FIG. 4, includes a first end 32 and a second end 34. The first end 32 as well as a short portion 33 may have a reduced diameter which is adapted to engage within one of the ends of the biopsy tube. The tube shaft 30 may also be formed as a hollow cylinder. The tube shaft may have a through bore 38 which may provide several functions. The through bore 38 may have a smaller diameter sufficient for injecting or retracting a fluid through the shaft or may have a greater diameter sufficient for allowing retraction of tissue. In a case in which the diameter of the through bore 38 in the tube shaft is equal or at least similar to the inner diameter of the biopsy tube 20, a separate element like a fiber body may be inserted and movably accommodated within the combination of the biopsy tube and the tube shaft.

Figure 5:
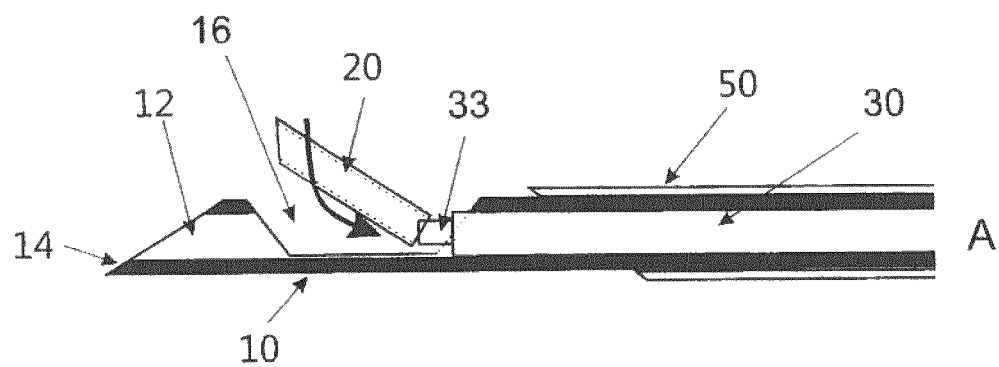
FIG. 5 illustrates steps of inserting a biopsy tube into a notch of a main shaft of a biopsy device, according to a first embodiment.
Figure 5:
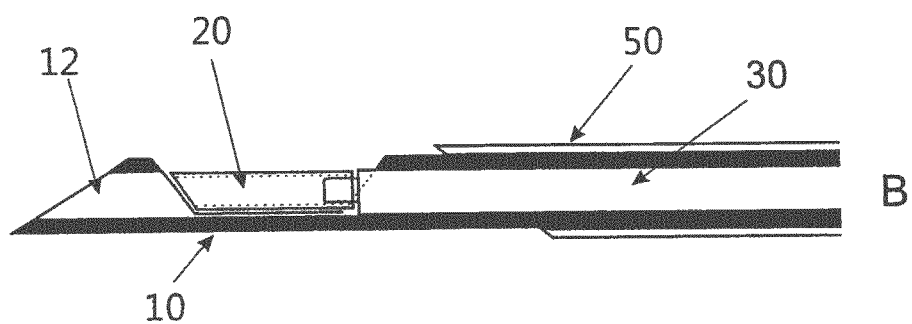

The biopsy device as shown in FIG. 5 comprises a hollow shaft 10 with a distal end or tip 14 forming a slanted surface, wherein the slanted surface may have an oval shape in case the hollow shaft has a circular cross section. Furthermore, a lateral recess or notch 16 is formed in the shaft, wherein the notch 16 is substantially formed by a lateral opening and a section of the bore extending through the shaft in a longitudinal direction. FIG. 5 further illustrates as to how a biopsy tube 20 may be inserted into a notch 16 of a main shaft 10 of a biopsy device so as to be attached at the distal end 32 of the tube shaft 30.

For example, the biopsy tube 20 may be inserted with an inclined orientation and with the proximal end 22 first. This may have the advantage that an attachment of the biopsy tube to the distal end of the tube shaft may be better controlled by hand. The kind of movement of this example is indicated by the bold arrow in FIG. 5.

Alternatively, the biopsy tube 20 may be inserted into the notch 16 of the main shaft 10 with a parallel orientation of the longitudinal axis of the biopsy tube and the longitudinal axis of the main shaft. In this case, the tube shaft 30 may be pulled a few millimetres backwards, i.e. proximally, to give the biopsy tube enough space to be inserted into the notch. Subsequently, the tube shaft 30 may be pushed forwards, i.e. distally, so that the portion 33 with the reduced diameter may engage the biopsy tube so as to attach the biopsy tube to the tube shaft.

Figure 6:
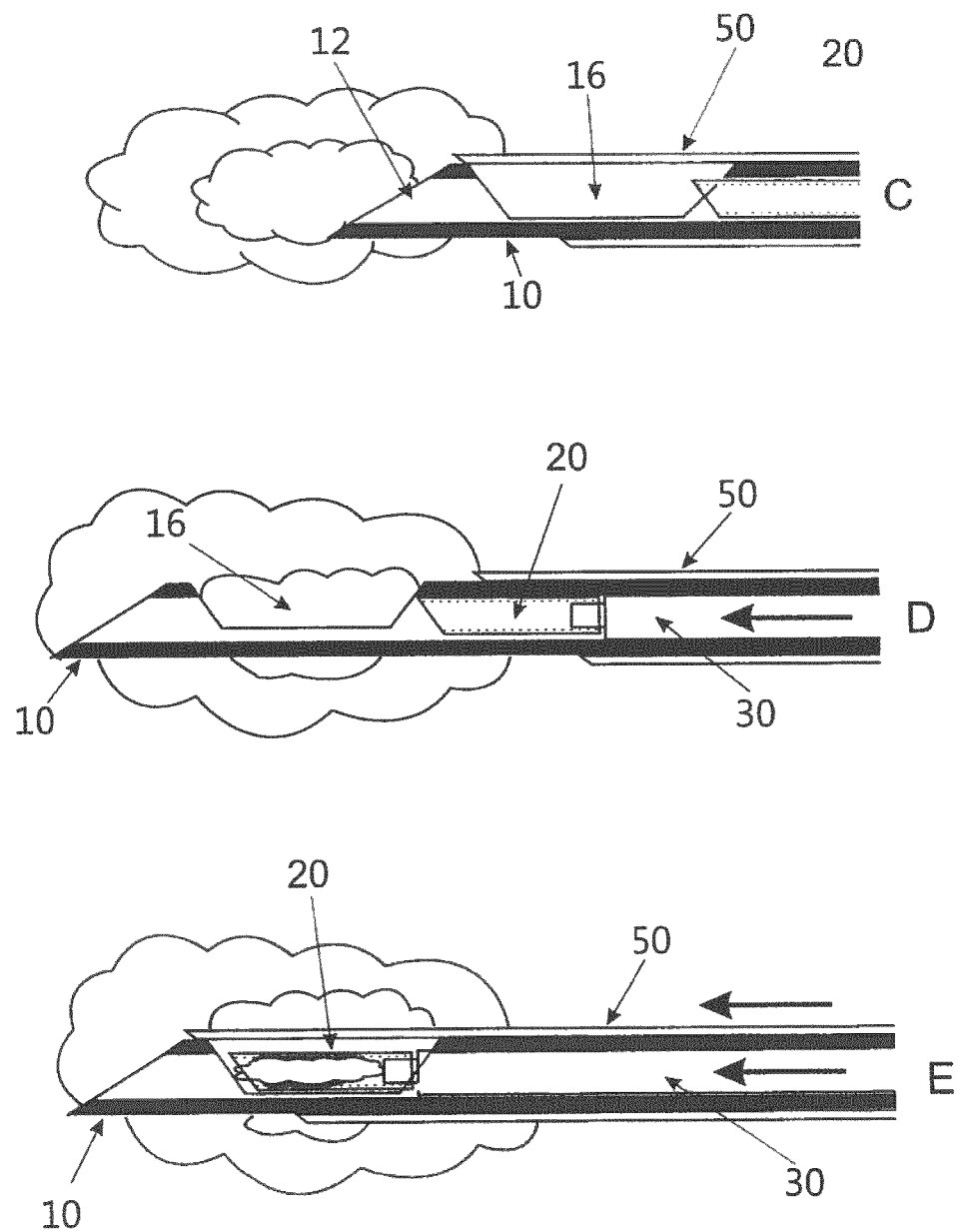
FIG. 6 illustrates steps of taking a biopsy with a biopsy device of FIG. 5.

FIG. 6 shows a sequence of steps of taking a biopsy by means of a biopsy device including, inter alia, a biopsy tube 20 for receiving tissue. Firstly, with the notch 16 of the main shaft 10 being covered by the outer sleeve 50, the biopsy device is inserted into tissue. Secondly, the main shaft is pushed forward until the notch in the main shaft is no longer covered so that tissue can engage the notch 16. Thirdly, the outer sleeve 50 which is provided with a sharp distal edge in accordance with this example, is pushed forwards so as to cut the tissue and the tube shaft 30 with the biopsy tube 20 is pushed forward so as to receive the cut tissue. It is noted that the outer sleeve 50 may also have a blunt distal edge, i.e. not a sharp distal edge, and that the biopsy tube 20 may be provided with a sharp distal edge, so that tissue which is present in the notch 16 of the main shaft 10 can be cut by means of the biopsy tube 20.

Figure 7:
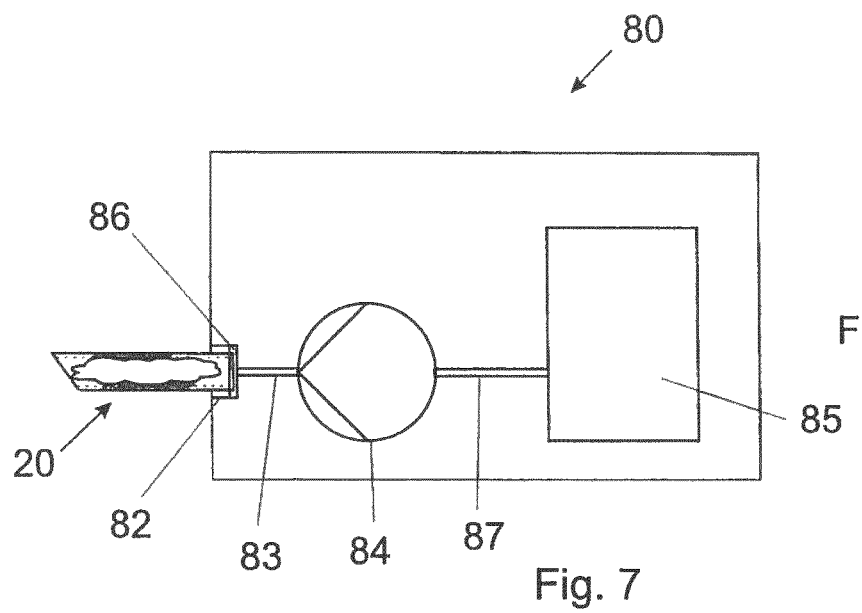
FIG. 7 shows a processing station for processing biopsy tissue.

FIG. 7 illustrates a processing station 80 for processing tissue extracted from a body by a tube 20. The processing station 80 comprises a tube retainer 82, a pumping device 84 as well as a as a reservoir 85 for a liquid or fluid. One end of the tube 20 may engage with the tube retainer 82.

The liquid or fluid in the reservoir 85 may be suitable for treating the tissue in the tube. For example, the liquid or fluid may be suitable for clearing the cellular structures of the tissue. Otherwise, the fluid or liquid may be for staining the tissue. When activated, the pumping device 84 will suck at its entering side the liquid or fluid from the reservoir 85 through the fluid channel 87, and will supply the liquid or fluid under pressure through the fluid channel 83 on its exit side.

A seal 86 may be located in the tube retainer 82 so as to seal a fluid path from the fluid channel 83 into the end of the tube 20.

Although it is shown in FIG. 7 that the tube 20 is retained at its end portion in the tube retainer 82, it will be understood, that the tube retainer 82 may also engage the tube 20 at any other portion of the tube. However, the second end of the tube 20 shall have an opening so as to allow air or fluid to exit the tube as soon as the liquid or fluid which is supplied under pressure through the fluid channel 83, enters the first end of the tube 20.

Figure 8:
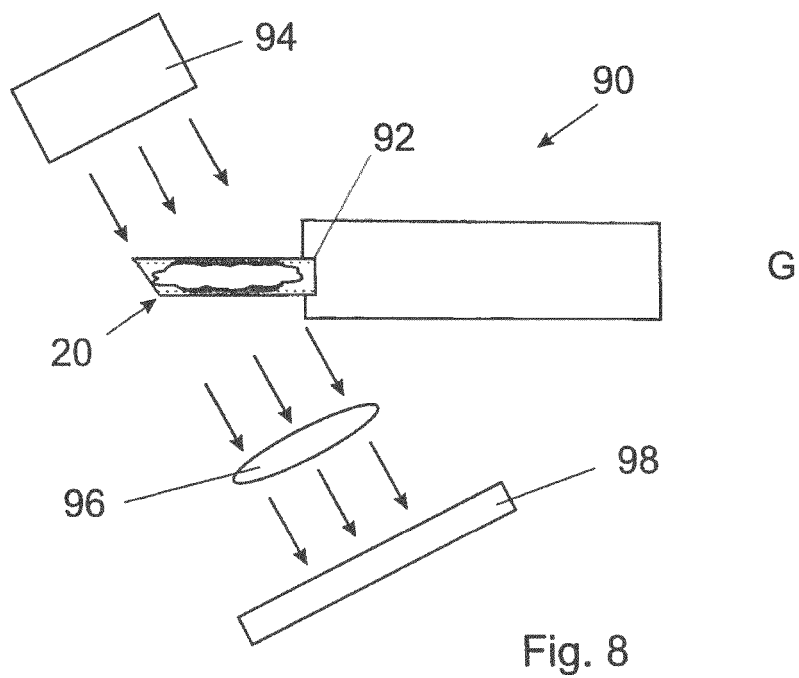
FIG. 8 shows inspection device for optical inspection of the biopsy tissue.

FIG. 8 illustrates an embodiment for investigating or analysing the tissue in the tube 20. Here, a device 90 is provided with a tube retainer 92 which, like the tube retainer 82 of the embodiment in FIG. 7, retains an end portion of the tube 20. Preferably, the tube 20 is made of a transparent material allowing an optical imaging or scanning of the tissue enclosed by the tube 20.

A radiation source 94 is arranged relative to the tube 20 and is configured so as to apply a radiation, for example light with a predetermined frequency to the tube 20. The radiation passing through the tube and the tissue within the same may be detected by a radiation detector 98 so as to provide images or at least data allowing further investigation or analyzing of the tissue. An improved detection of the radiation may be achieved by providing a lens 96 within the light path between the tube 20 and the radiation detector 98.

Figure 9:
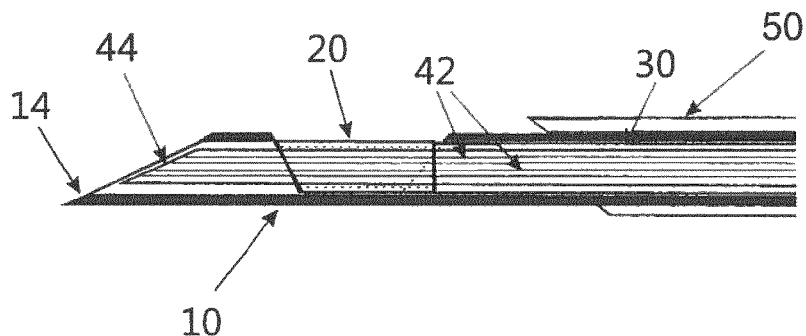
FIG. 9 shows a biopsy device including a fiber body.

FIG. 9 shows another embodiment of a biopsy device, wherein this embodiment mainly differs from the above described embodiments in that additionally a fiber body is inserted through the tube shaft and the biopsy tube. The fiber body may be formed by an elongated and solid element in which channels for accommodating optical fibers 42 are provided. The fiber body may include an end surface 44 forming a bevel at the distal end of the fiber body.

An optical fiber 42 may be provided for illuminating and collecting light, with a distal end of the optical fiber at the tip, i.e. at the end surface 44 of the fiber body. The proximal end of the fiber may be connected to an optical console capable of emitting and receiving light. For optimal tissue sensing, it may be advantageous to guide at least two optical fibers 42 (source and detector) towards the tip, with the fiber tip ends having a maximized distance from each other.

As a further feature, an opening for applying vacuum can be realized within the main shaft, the tube shaft and/or in the fiber body, and it may be used for sucking tissue into the notch 16 after the main shaft 10 has been ejected to ensure that the biopsy is of sufficient size. By way of this, the vacuum may also ensure that the tissue is brought in close contact with the optical fibers 42 facing the proximal side of the exposed notch 16, for the case that the tissue in the notch is characterized prior to obtaining the biopsy.

The incorporation of a small opening for applying vacuum can also allow for simultaneous biological/physiological analysis of the blood/tissue under consideration, thus obtaining a better biopsy quality. The vacuum can be used to suck in small amounts (microliter) of body fluid (for instance blood/serum, bile, or else) for instant biochemical analysis, which can be used to complement the optical tissue characterization.

For this, the vacuum is preferably realized by a small vacuum opening within or at the fiber body, so that the blood sampling can be performed within the described design at the tip and also in the notch. The absorbed blood/cells could be analyzed by appropriate detectors (such as chip-sized microfluidic devices and/or microelectromechanical systems (MEMS)) connected to the distal end of the vacuum channel, thereby enabling instantaneous analysis.

For instance, MEMS-based pH sensors could allow for complementary classification of tumor (acidic) vs. normal (basic) tissue based on pH. Apart from pH sensors, also other specific sensors may be used that could characterize the tissue sample in consideration. This could serve as complimentary means to support the optical tissue sensing in difficult cases, and thereby improve the results of photonic biopsy procedures even further. The optical fibers and the vacuum channel may be integrated into the shaft and/or fiber body in a way to ensure (1) a sufficiently large fiber distance for tissue characterization, and that (2) the opening has an appropriate size for sucking the tissue samples into the biopsy tube without hampering the stability of the shaft and/or fiber body.

Through FIGS. 5, 6, 7 and 8, steps of a method are depicted, indicated by the capital letters A to G. The method starts with an insertion of a tube 20 into a biopsy device and ends with an optical analysis of the biopsy tissue. It will be understood that the illustrated method steps are main steps which can be divided into sub-steps. Furthermore, there may be sub-steps between the major steps.

Figure 10:
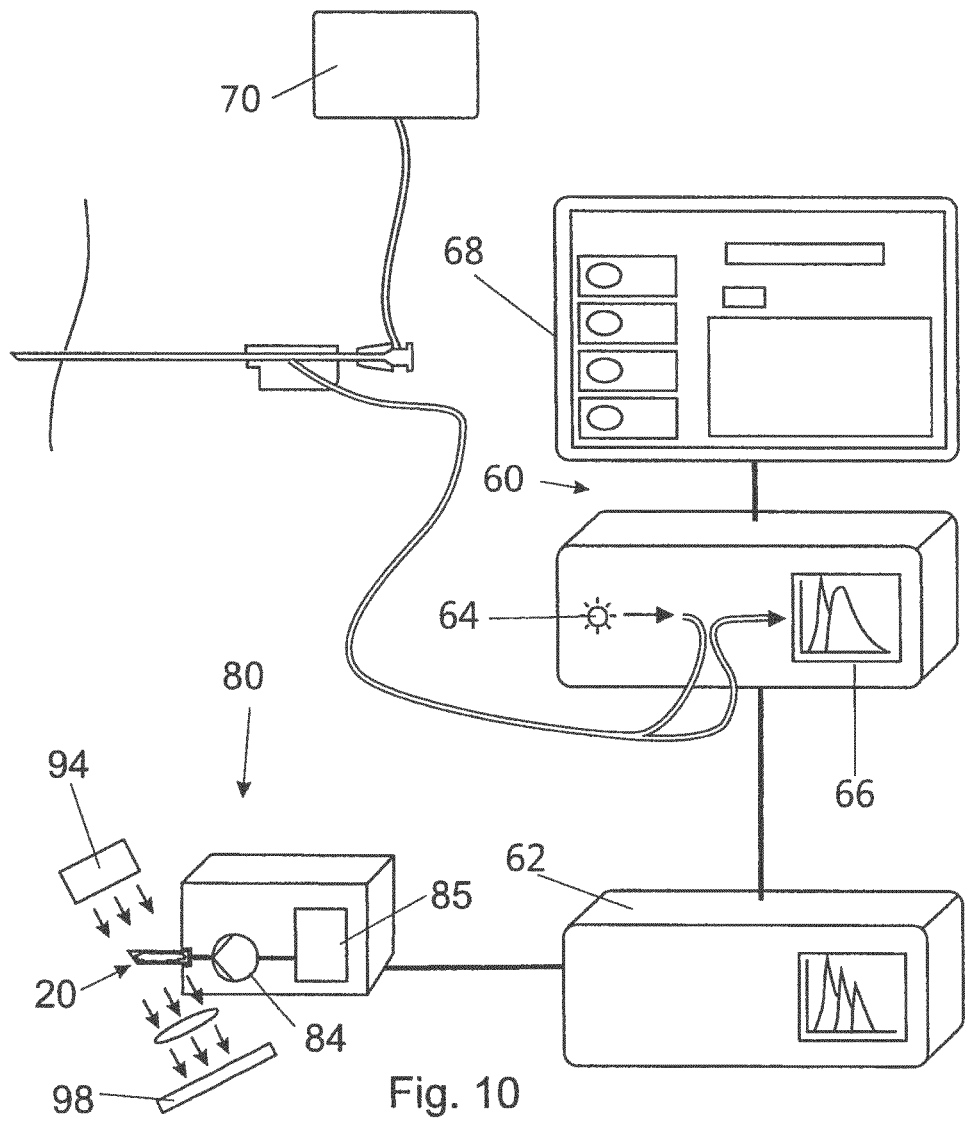
FIG. 10 shows a system including a biopsy device and a console.

As shown in FIG. 10, the fibers of the interventional device may be connected to an optical console 60. The optical fibers can be understood as light guides or optical waveguides. In an embodiment, the console 60 comprises a light source 64 in the form of a halogen broadband light source with an embedded shutter, and an optical detector 66. The optical detector 66 can resolve light with a wavelength substantially in the visible and infrared regions of the wavelength spectrum, such as from 400 nm to 1700 nm. The combination of light source 64 and detector 66 allows for diffuse reflectance measurements. For a detailed discussion on diffuse reflectance measurements see R. Nachabe, B. H. W. Hendriks, A. E. Desjardins, M. van der Voort, M. B. van der Mark, and H. J. C. M. Sterenborg, "Estimation of lipid and water concentrations in scattering media with diffuse optical spectroscopy from 900 to 1600 nm", J. Biomed. Opt. 15, 037015 (2010).

Optionally it is also possible that the console is coupled to an imaging modality capable of imaging the interior of the body, for instance when the biopsy is taken under image guidance. In this case it is also possible to store the image of the interior when the biopsy is taken to a container of the biopsy. In this case the in-vivo information of the optical biopsy needle, the information of the pathology of the biopsy as well as the location where the biopsy was taken may be brought together for advanced pathology.

On the other hand, also other optical methods can be envisioned like diffuse optical tomography by employing a plurality of optical fibers, differential path length spectroscopy, fluorescence and Raman spectroscopy to extract tissue properties.

Further shown in FIG. 10 are a suction device 70 and a device 62 for obtaining ex-vivo pathology information. The suction device may be connected to a proximal end of the biopsy device, such that underpressure or a vacuum can be applied through the biopsy device to the distal end of the same, in particular to the notch at the distal end of the biopsy device.

The device 62 may be connected on the one hand to the console 60 and on the other hand to the device 80 by means of wires or wireless, for interchanging information like control commands or data representing pathological aspects of an inspected tissue sample.

It is to be noted, that the device 80 in FIG. 10 provides a combination of the devices as shown in FIGS. 7 and 8. In other words, the device 80 in FIG. 10 comprises a pumping device 84 in a reservoir 85 for processing the tissue in the tube 20 by a fluid or liquid under pressure, and further comprises a radiation source 94 and a detector 98 for optical inspection of the tissue within the tube 20.

The device 62 may be a digital pathology system consisting of an optical scanner and an image management system to enable digitizing, storage, retrieval, and processing of tissue staining images, reading the information stored in the storage box container, and integrating this information with the digitized staining data set, to be presented to the pathologist. In addition to this, the data set from the photonic biopsy device may be either presented next to the histopathology image or the two data sets may be fused in the image, characterized and recognizable by a certain coloring pattern of the image. For instance the oxygenation level measured in-vivo could be added as a red color, where deep red means low oxygenation and bright red would mean high oxygenation level. Additionally, molecular spatial distributions from FTIR or Raman could be added as a color coded mapping to the pathology slide of specific molecules.

It may be summarized that the tissue sample, which may firstly be subjected to an in-vivo tissue inspection, i.e. an inspection within a living body, may secondly subjected to an ex-vivo tissue inspection by means of the devices 80 and 62.

A processor transforms the measured spectrum into physiological parameters that are indicative for the tissue state and a monitor 68 may be used to visualize the results.

A computer program executable on the processor may be provided on a suitable medium such as an optical storage medium or a solid-state medium supplied together with or as part of the processor, but may also be distributed in other forms, such as via the Internet or other wired or wireless telecommunication systems.

For fluorescence measurements the console must be capable of providing excitation light to at least one source fiber while detecting tissue-generated fluorescence through one or more detection fibers. The excitation light source may be a laser (e.g. a semiconductor laser), a light-emitting diode (LED) or a filtered light source, such as a filtered mercury lamp. In general, the wavelengths emitted by the excitation light source are shorter than the range of wavelengths of the fluorescence that is to be detected. It is preferable to filter out the excitation light using a detection filter in order to avoid possible overload of the detector by the excitation light. A wavelength-selective detector, e.g. a spectrometer, is required when multiple fluorescent entities are present that need to be distinguished from each other.

In case fluorescence measurements are to be combined with diffuse reflectance measurements, the excitation light for measuring fluorescence may be provided to the same source fiber as the light for diffuse reflectance. This may be accomplished by, e.g., using a fiber switch, or a beam splitter or dichroic beam combiner with focusing optics. Alternatively, separate fibers may be used for providing fluorescence excitation light and light for diffuse reflectance measurements.

The described devices can be used in minimally invasive needle interventions such as low-back pain interventions or taking biopsies in the field of cancer diagnosis or in case where tissue characterization around the needle is required.

While the invention has been illustrated and described in detail in the drawings and foregoing description, such illustration and description are to be considered illustrative or exemplary and not restrictive; the invention is not limited to the disclosed embodiments. Other variations to the disclosed embodiments may be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

LIST OF REFERENCE SIGNS 10 main shaft
12 channel of main shaft
14 distal tip
16 notch
18 recess
20 biopsy tube
22 proximal end
24 distal end
26 longitudinal axis
28 channel of biopsy tube
30 tube shaft
32 first end 33 end portion
34 second end
36 longitudinal axis
38 channel of tube shaft
42 optical fiber
44 end surface of fiber body
50 outer sleeve
52 cutting edge
54 lateral opening
56 inwardly protruding edge
60 console
62 device for ex-vivo tissue inspection
64 light source
66 light detector
68 monitor
70 suction device
80 tissue processing device
82 tube retainer
83, 87 fluid channel
84 pumping device
85 reservoir
86 seal
90 tissue inspection device
92 tube retainer
94 radiation source
96 lens
98 radiation detector
100 shaft
200 notch
220 inner region of tissue sample
240 outer region of tissue sample
260 tissue sample
300 open receptacle
400 staining fluid
500 outer member

The invention claimed is:

1. A system for processing an intact 3D tissue sample, comprising:
   a tube, the tube having a first open end, a second open end and an inner space dimensioned to accommodate the 3D tissue sample,
   a tube retainer, and
   a pump arranged to supply a tissue processing fluid under pressure into the tube,
   wherein, when the tube is retained by the tube retainer, one of the first and second open ends of the tube is arranged so that the tissue processing fluid is suppliable into the tube and the tissue processing fluid is forced through the 3D tissue sample while the 3D tissue sample is accommodated and retained in the tube;
   wherein the tube has a length between 5 mm and 20 mm.

2. A system for processing an intact 3D tissue sample, comprising:
   a tube, the tube having a first open end, a second open end and an inner space dimensioned to accommodate the 3D tissue sample,
   a tube retainer, and
   a pump arranged to supply a tissue processing fluid under pressure into the tube,
   wherein, when the tube is retained by the tube retainer, one of the first and second open ends of the tube is arranged so that the tissue processing fluid is suppliable into the tube and the tissue processing fluid is forced through the 3D tissue sample while the 3D tissue sample is accommodated and retained in the tube;
   wherein the tube has an outer diameter of up to 2 mm.

3. A system for processing an intact 3D tissue sample, comprising:
   a tube, the tube having a first open end, a second open end and an inner space dimensioned to accommodate the 3D tissue sample,
   a tube retainer, and
   a pump arranged to supply a tissue processing fluid under pressure into the tube,
   wherein, when the tube is retained by the tube retainer, one of the first and second open ends of the tube is arranged so that the tissue processing fluid is suppliable into the tube and the tissue processing fluid is forced through the 3D tissue sample while the 3D tissue sample is accommodated and retained in the tube;
   wherein the tube has an outer diameter of up to 1 mm.

* * * * *